United States Patent
Chao et al.

(10) Patent No.: US 10,839,793 B2
(45) Date of Patent: *Nov. 17, 2020

(54) AUTOMATICALLY DETERMINING LANGUAGE FOR SPEECH RECOGNITION OF SPOKEN UTTERANCE RECEIVED VIA AN AUTOMATED ASSISTANT INTERFACE

(71) Applicant: Google LLC, Mountain View, CA (US)

(72) Inventors: Pu-Sen Chao, Los Altos, CA (US); Diego Melendo Casado, Mountain View, CA (US); Ignacio Lopez Moreno, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 257 days.

This patent is subject to a terminal disclaimer.

(21) Appl. No.: 15/769,013

(22) PCT Filed: Apr. 16, 2018

(86) PCT No.: PCT/US2018/027808
§ 371 (c)(1),
(2) Date: Apr. 17, 2018

(87) PCT Pub. No.: WO2019/203794
PCT Pub. Date: Oct. 24, 2019

(65) Prior Publication Data
US 2020/0135184 A1    Apr. 30, 2020

(51) Int. Cl.
*G10L 15/22* (2006.01)
*G10L 15/197* (2013.01)
(Continued)

(52) U.S. Cl.
CPC ............ *G10L 15/197* (2013.01); *G10L 13/00* (2013.01); *G10L 15/005* (2013.01); *G10L 15/08* (2013.01);
(Continued)

(58) Field of Classification Search
CPC ... G10L 15/22; G10L 2015/223; G10L 15/26; G10L 15/265; G10L 15/30; G10L 15/08;
(Continued)

(56) References Cited

U.S. PATENT DOCUMENTS 7,873,517 B2   1/2011   Prieto et al.
9,031,829 B2   5/2015   Leydon et al.
(Continued)

FOREIGN PATENT DOCUMENTS

WO    2015112149         7/2015
WO    WO-2015196063 A1 * 12/2015  ............. G10L 15/28

OTHER PUBLICATIONS

European Patent Office; International Search Report and Written Opinion of PCT Ser. No. PCT/US2018/027808; dated Nov. 26, 2018; 20 pages.

(Continued)

*Primary Examiner* — Edgar X Guerra-Erazo
(74) *Attorney, Agent, or Firm* — Middleton Reutlinger

(57) ABSTRACT

Determining a language for speech recognition of a spoken utterance received via an automated assistant interface for interacting with an automated assistant. Implementations can enable multilingual interaction with the automated assistant, without necessitating a user explicitly designate a language to be utilized for each interaction. Implementations determine a user profile that corresponds to audio data that captures a spoken utterance, and utilize language(s), and optionally corresponding probabilities, assigned to the user profile in determining a language for speech recognition of the spoken utterance. Some implementations select only a subset of languages, assigned to the user profile, to utilize in speech recognition of a given spoken utterance of the user. Some implementations perform speech recognition in each of multiple languages assigned to the user profile, and utilize (Continued)

criteria to select only one of the speech recognitions as appropriate for generating and providing content that is responsive to the spoken utterance.

20 Claims, 5 Drawing Sheets

(51) Int. Cl.
  *G10L 15/00* (2013.01)
  *G10L 15/30* (2013.01)
  *G10L 15/08* (2006.01)
  *G10L 15/14* (2006.01)
  *G10L 15/18* (2013.01)
  *G10L 13/00* (2006.01)
(52) U.S. Cl.
  CPC .......... *G10L 15/14* (2013.01); *G10L 15/1822* (2013.01); *G10L 15/22* (2013.01); *G10L 15/30* (2013.01); *G10L 2015/088* (2013.01); *G10L 2015/223* (2013.01); *G10L 2015/228* (2013.01)
(58) Field of Classification Search
  CPC ....... G10L 15/00; G10L 17/005; G06F 3/167; G06F 3/0482; G06F 3/16
  See application file for complete search history.

(56) References Cited

U.S. PATENT DOCUMENTS

| | | | |
|---|---|---|---|
| 10,679,615 B2* | 6/2020 | Chao | G10L 15/005 |
| 2011/0055256 A1 | 3/2011 | Phillips et al. | |
| 2014/0280051 A1* | 9/2014 | Djugash | B60W 50/08 707/722 |
| 2015/0006147 A1 | 1/2015 | Schmidt | |
| 2015/0120288 A1* | 4/2015 | Thomson | G10L 15/22 704/231 |
| 2015/0302855 A1 | 10/2015 | Kim et al. | |
| 2015/0364129 A1 | 12/2015 | Gonzalez-Dominguez et al. | |
| 2016/0035346 A1 | 2/2016 | Chengalvarayan | |
| 2016/0162469 A1* | 6/2016 | Santos | G10L 15/22 704/10 |
| 2016/0217788 A1* | 7/2016 | Stonehocker | G10L 15/26 |
| 2016/0217790 A1 | 7/2016 | Sharifi | |
| 2016/0329048 A1 | 11/2016 | Li et al. | |
| 2019/0318729 A1* | 10/2019 | Chao | G10L 15/08 |

OTHER PUBLICATIONS

European Patent Office; International Search Report and Written Opinion of PCT Ser. No. PCT/US2018/027812; 14 pages; dated Oct. 1, 2018.

Gonzalez-Dominguez, J., et al. "A Real-Time End-to-End Multilingual Speech Recognition Architecture". IEEE Journal of Selected Topics in Signal Processing, vol. 9, No. 4, Jun. 2015; pp. 749-759.

European Patent Office; Invitation to Pay Additional Fees in International Patent Application No. PCT Ser. No. PCT/US2018/027808 dated Oct. 2, 2018; 14 pages.

Eueropean Patent Office; Intention to Grant issue in Application No. 18722334.2; 48 pages; dated Jun. 8, 2020.

* cited by examiner

300

```
┌─────────────────────────────────────────────────────────────────────┐
│ PROCESSING AUDIO DATA USING ONE OR MORE ACOUSTIC MODELS TO MONITOR  │
│  FOR AN OCCURRENCE OF AN INVOCATION PHRASE CONFIGURED TO INVOKE AN  │
│                        AUTOMATED ASSISTANT                          │
│                                302                                  │
└─────────────────────────────────────────────────────────────────────┘
                                   │
                                   ▼
┌─────────────────────────────────────────────────────────────────────┐
│ DETECTING, BASED ON THE PROCESSING OF THE AUDIO DATA, THE OCCURRENCE│
│     OF THE INVOCATION PHRASE IN A PORTION OF THE AUDIO DATA         │
│                                304                                  │
└─────────────────────────────────────────────────────────────────────┘
                                   │
                                   ▼
┌─────────────────────────────────────────────────────────────────────┐
│    DETERMINING, BASED ON THE PROCESSING OF THE AUDIO DATA OR OTHER  │
│  PROCESSING USING ONE OR MORE OTHER ACOUSTIC MODELS, THAT THE PORTION│
│ OF THE AUDIO DATA THAT INCLUDES THE INVOCATION PHRASE CORRESPONDS TO│
│         A USER PROFILE ACCESSIBLE TO THE AUTOMATED ASSISTANT        │
│                                306                                  │
└─────────────────────────────────────────────────────────────────────┘
                                   │
                                   ▼
┌─────────────────────────────────────────────────────────────────────┐
│             IDENTIFYING A LANGUAGE ASSIGNED TO THE USER PROFILE     │
│                                308                                  │
└─────────────────────────────────────────────────────────────────────┘
                                   │
                                   ▼
┌─────────────────────────────────────────────────────────────────────┐
│   SELECTING A SPEECH RECOGNITION MODEL FOR THE LANGUAGE BASED ON    │
│         IDENTIFYING THE LANGUAGE AS ASSIGNED TO THE USER PROFILE    │
│                                310                                  │
└─────────────────────────────────────────────────────────────────────┘
                                   │
                                   ▼
┌─────────────────────────────────────────────────────────────────────┐
│ USING THE SELECTED SPEECH RECOGNITION MODEL TO PROCESS A SUBSEQUENT │
│   PORTION OF THE AUDIO DATA THAT FOLLOWS THE PORTION OF AUDIO DATA  │
│                                312                                  │
└─────────────────────────────────────────────────────────────────────┘
                                   │
                                   ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ CAUSING THE AUTOMATED ASSISTANT TO PROVIDE RESPONSIVE CONTENT THAT  │
│  IS DETERMINED BASED ON THE PROCESSING OF THE SUBSEQUENT PORTION OF │
│     THE AUDIO DATA USING THE SELECTED SPEECH RECOGNITION MODEL      │
│                                314                                  │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

FIG. 3

AUTOMATICALLY DETERMINING LANGUAGE FOR SPEECH RECOGNITION OF SPOKEN UTTERANCE RECEIVED VIA AN AUTOMATED ASSISTANT INTERFACE

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e. utterances), which may in some cases be converted into text and then processed, and/or by providing textual (e.g., typed) natural language input. An automated assistant responds to a request by providing responsive user interface output, which can include audible and/or visual user interface output.

As mentioned above, an automated assistant can convert audio data, corresponding to a spoken utterance of a user, into corresponding text (or other semantic representation). For example, audio data can be generated based on detection of a spoken utterance of a user via one or more microphones of a client device that includes an assistant interface for enabling the user to interact with an automated assistant. The automated assistant can include a speech recognition engine that attempts to recognize various characteristics of the spoken utterance captured in the audio data, such as the sounds produced (e.g., phonemes) by the spoken utterance, the order of the produced sounds, rhythm of speech, intonation, etc. Further, the speech recognition engine can identify text words or phrases represented by such characteristics. The text can then be further processed by the automated assistant (e.g., using a natural language understanding (NLU) engine and/or a dialog state engine) in determining responsive content for the spoken utterance. The speech recognition engine can be implemented by the client device and/or by one or more automated assistant component(s) that are remote from, but in network communication with, the client device.

However, many speech recognition engines are configured to recognize speech in only a single language. For multilingual users and/or households, such single language speech recognition engines can be unsatisfactory, and can cause an automated assistant to fail and/or provide erroneous output when a spoken utterance is received in an additional language that is not the single language supported by the speech recognition engines. This can render the automated assistant unusable and/or lead to excess usage of computational and/or network resources. Excess usage of computational and/or network resources can be a result of a user needing to provide a further spoken utterance, that is in the single language supported, when the automated assistant fails or provides erroneous output. Such further spoken utterance must additionally be processed by a corresponding client device and/or remote automated assistant component(s), thereby causing additional usage of various resources.

Other speech recognition engines may be configured to recognize speech in multiple languages, but require a user to explicitly designate which of the multiple languages should be utilized in speech recognition at a given time. For example, some of the other speech recognition engines may require a user to manually designate a default language to be utilized in speech recognition of all spoken utterances received at a particular client device. To change the default language to another language, the user can be required to interact with a graphical and/or audible interface to explicitly alter the default language. Such interaction can lead to excess usage of computational and/or network resources in the rendering of the interface, the processing of inputs of the user provided via the interface, etc. Further, it may often be the case that a user forgets to change the default language prior to providing a spoken utterance that is not currently the default language. This can render the automated assistant unusable and/or lead to excess usage of computational and/or network resources as described above.

SUMMARY

Implementations described herein relate to systems, methods, and apparatus for automatically determining a language for speech recognition of a spoken utterance received via an automated assistant interface. In some implementations, speech recognition of a spoken utterance using a given language can include processing audio data, which captures the spoken utterance, using one or more speech recognition models for the given language in order to generate text that corresponds to the spoken utterance, and that is in the given language. As described herein, multiple speech recognition models can be accessible for speech recognition, and each of the speech recognition models can be configured for a corresponding language of multiple languages. For example, a first speech recognition model can be configured for generating English text based on processing audio data including English spoken utterances, a second speech recognition model can be configured for generating French text based on processing audio data including French spoken utterances, a third speech recognition model can be configured for generating Spanish text based on processing audio data including Spanish spoken utterances, etc.

Some implementations described herein can utilize various techniques to select only a subset of languages to utilize in speech recognition of a given spoken utterance of a given user. For example, the given user can have a user profile with multiple candidate languages assigned to the user profile. The multiple candidate languages can be manually assigned to the user profile by the user and/or automatically assigned based on past usage of the candidate language(s) by the user across one or more platforms. As described in more detail below, selecting only the subset of languages can be based on, for example, probability metrics assigned to the multiple candidate languages for the user profile, which can be based on past usage of the multiple candidate languages for the user profile, and which can each correspond to one or more contextual parameters (e.g., each based on past usage of a corresponding language for the user profile, given the contextual parameter(s)).

As one particular example, a single particular language, of multiple languages assigned to the user profile, can have an assigned probability metric, for one or more current contextual parameters (e.g., a client device via which the given spoken utterance is detected, a time of day, and/or a day of the week), where the probability metric indicates a very high likelihood of the single particular language being spoken by the given user. Based on the assigned probability metric, the single particular language can be selected, and speech recognition performed using only speech recognition model(s) for the single language. Performing the speech recognition can result in corresponding text, in the single language, that can then be further processed by additional component(s) of an automated assistant in generating content that is responsive to the given spoken utterance. The content that is responsive can then be provided for rendering at the client device for presentation to the user. The content that is responsive can optionally be in the same single language, or provided to cause rendering in the same single language.

As another particular example, two particular languages, of three or more candidate languages assigned to the user profile, can have corresponding assigned probability metrics, for one or more current contextual parameters, where the probability metrics each indicate at least a threshold likelihood of a corresponding one of the two particular languages being spoken by the given user. Based on the assigned probability metrics, the two particular languages can be selected, and speech recognition of the given spoken utterance performed using only speech recognition models for the two particular languages. The other candidate language(s) may not be selected for speech recognition based on their corresponding assigned probability metrics, for the one or more current contextual parameters, failing to satisfy a threshold.

Performing the speech recognition using the speech recognition model for a first of the two particular languages can result in corresponding first text, in the first language, and optionally a first measure that indicates a likelihood that the first text is representative of the given spoken utterance. Performing the speech recognition using the speech recognition model for a second of the two particular languages can result in corresponding second text, in the second language, and optionally a second measure that indicates a likelihood that the second text is representative of the given spoken utterance. One of the first text or the second text can then be selected as appropriate text for generating and providing content that is responsive to the given spoken utterance.

In some implementations, one of the first text or the second text is selected based on the first and second measures that indicate corresponding likelihoods that they are representative of the given spoken utterance. For example, if the first measure indicates an 80% likelihood the first text is representative of the given spoken utterance, and the second measure indicates a 70% likelihood the second text is representative of the given spoken utterance, the first text can be selected in lieu of the second text in view of the first measure indicating a greater likelihood than the second measure. In some of those implementations, the probability metrics for the two particular languages can further be considered. For example, assume again that the first measure indicates an 80% likelihood and the second measure indicates a 70% likelihood, and further assume that the probability metric for the first language (for the one or more contextual parameters) is 30% and the probability metric for the second language (for the one or more contextual parameters) is 65%. In such an example, the second text can be selected in lieu of the first based on consideration of both the measures that indicate the likelihoods that the first and second texts are representative of the given spoken utterance, and the probability metrics for the first and second languages. For instance, a score for the first text can be based on 70% and 65% (e.g., a score of 0.455 based on 0.7*0.65) and a score for the second text can be based on 80% and 30% (e.g., a score of 0.24 based on 0.8*0.3), and the first text selected based on having the higher score.

These and other implementations that select only a subset of candidate languages of a user to utilize in speech recognition of a spoken utterance of the user can conserve various resources of device(s) (e.g., client device(s) and/or remote automated assistant component(s)) that perform the speech recognition), as only speech recognition model(s) that correspond to the subset of languages are utilized in performing the speech recognition. Further, these and other implementations that utilize probability metrics for languages and/or measures for generated text can increase the likelihood that an automated assistant generates responsive content based on the appropriate text. This can lead to an improved automated assistant, and can also conserve various resources as it mitigates risk of the automated assistant providing errant responsive content based on recognition of text using a language that is not the language being spoken in a spoken utterance. Such mitigation of risk of errant responsive content prevents further resource intensive detection of further user interface input (and processing of that input) in attempting to rectify the errant responsive content.

Some implementations described herein can additionally or alternatively utilize various techniques to perform speech recognition, of a given spoken utterance of a given user, in each of multiple languages assigned to a user profile of the given user. In those implementations, probability metrics (optionally dependent on current contextual parameter(s)) for the multiple languages and/or measures for each of the speech recognitions can still be utilized to select only one of the speech recognitions as appropriate for generating and providing content that is responsive to the given spoken utterance. As one particular example, assume the given user has only a first language and a second language assigned in a user profile of the given user. Further assume the first language has a probability metric of 60% and the second language has a probability metric of 40%. Speech recognition of the given spoken utterance can be performed using a first speech recognition model for the first language to generate first text in the first language, and a measure that indicates a 70% likelihood the first text is representative of the given spoken utterance. Speech recognition of the given spoken utterance can also be performed using a second speech recognition model for the second language to generate second text in the second language, and a measure that indicates a 70% likelihood the second text is representative of the given spoken utterance. One of the first text or the second text can then be selected as appropriate text for generating and providing content that is responsive to the given spoken utterance. For example, the first text can be selected in lieu of the second text based on the first language probability metric (60%) being higher than the second language probability metric (40%), and based on the first and second text measures being the same (70%).

These and other implementations that utilize probability metrics for languages and/or measures for generated text can increase the likelihood that an automated assistant generates responsive content based on the appropriate text. This can lead to an improved automated assistant, and can also conserve various resources as it mitigates risk of the automated assistant providing errant responsive content based on recognition of text using a language that is not the language being spoken in a spoken utterance. Such mitigation of risk of errant responsive content prevents further resource intensive detection of further user interface input (and processing of that input) in attempting to rectify the errant responsive content.

As mentioned above, a user profile of a user providing a spoken utterance can be determined, and the user profile utilized to identify language(s) assigned to the user profile and/or probability metric(s) for the language(s), for use in various implementations described herein. In some implementations, the user profile is determined based on determining that at least a portion of audio data, that captures the spoken utterance, has one or more features (e.g., intonation, pitch, tone, accents, intonation, and/or any other feature) that correspond to feature(s) assigned to the user profile. For example, the audio data can be processed, using one or more acoustic models, to determine features of the audio data, and those feature(s) compared to feature(s) of candidate user profile(s) (e.g., candidate user profile(s) associated with a client device via which the audio data is received), and one of the candidate user profile(s) determined as the user profile for the audio data based on the comparison indicating a sufficient match.

In some of those implementations, the portion of the audio data that is determined to have feature(s) corresponding to feature(s) mapped to the user profile, is a portion that corresponds to an invocation phrase configured to invoke an automated assistant. An invocation phrase for an automated assistant contains one or more hot words/trigger words and can be, for example, "Hey Assistant", "OK Assistant", and/or "Assistant". Often, a client device that includes an assistant interface includes one or more locally stored acoustic models that the client device utilizes to monitor for an occurrence of a spoken invocation phrase. Such a client device can locally process received audio data utilizing the locally stored model, and discards any audio data that does not include the spoken invocation phrase. However, when local processing of received audio data indicates an occurrence of a spoken invocation phrase, the client device will then cause that audio data and/or following audio data to be further processed by the automated assistant.

For example, when the local processing indicates the occurrence of the invocation phrase, further processing can occur to determine a user profile and/or further processing can occur to perform speech recognition according to implementations described herein. For instance, in some implementations, when local processing of a portion of audio data utilizing a locally stored acoustic model indicates the occurrence of a spoken invocation phrase in the portion, output from the locally stored acoustic model can indicate feature(s) of the portion of audio data, and those feature(s) can be compared to feature(s) of candidate user profiles to determine a user profile that corresponds to the spoken invocation phrase (and resultantly, to the portion of the audio data that follows the spoken invocation phrase). Also, for instance, when local processing utilizing a locally stored acoustic model indicates the occurrence of a spoken invocation phrase in a portion of audio data, an additional acoustic model (local or remote) can optionally be utilized to process at least the portion of audio data, determine features of the at least the portion of the audio data, and determine a user profile that corresponds to those feature(s). In some implementations, additional or alternative techniques can be utilized to determine a user profile of a user providing a spoken utterance, such as techniques that use output from a camera of a client device to determine a user profile of a user providing a spoken utterance detected at the client device.

As mentioned above, a user profile can be created for a particular user of a device or application in order to, inter alia, characterize language preferences of the user. Users can be provided control over their user profiles, and a user can control whether any user profile is created for the user. A user profile for a user can identify multiple different languages that the user can use when engaging with the device or application. In some implementations, the user profile can be manually created or modified by the user in order that the user can manually designate preferred languages with which the user can engage with the automated assistant. For example, the user can provide an explicit natural language input such as, "My name is Chris and I speak English," in order to cause the automated assistant to set the English language in the user profile as a most probable language for the user to speak in when communicating with the automated assistant. As another example, the user can provide an explicit natural language input such as, "I speak English and Spanish" in order to cause the automated assistant to set both the English language and the Spanish language as candidate languages for the user in his/her user profile. Additionally or alternatively, one or more candidate languages assigned to a user profile for a user can be based on information that is associated with the user and accessible to the automated assistant such as, for example, emails, contact names, images that include text, location data, etc. For example, the user profile of a user can include candidate languages based on past interactions of the user with the automated assistant (and/or other platforms) using those candidate languages. Further, the user profile of a user can optionally have one or more corresponding probabilities assigned to each of the candidate languages. The one or more probabilities for a language, for the user profile of the user, can be based on past usage of that language by the user for past interactions with an automated assistant and/or past interactions with other platforms (e.g., email platforms, messaging platforms, and/or search platforms).

In some implementations, each language identified by a user profile can be associated with a probability that can depend on a context in which a user is interacting with the automated assistant. For instance, the user profile can identify a probability that a particular language will be employed by a user when a user is providing an invocation phrase for initializing the automated assistant to perform a particular action. Alternatively, or additionally, the probability associated with a particular language can be dynamic, and change during a dialogue sessions between a user and an automated assistant. Each of the languages can correspond to one or more speech recognition models, for converting an audio input that embodies a particular language, to text and/or other semantic representations that characterize the input. When selecting the language or user profile that will be used to interpret inputs from a user, the automated assistant can select speech recognition model(s) that are appropriate for a particular interaction.

The process for determining the language model(s) to use for a particular interaction can include operations such as: processing a stream of audio data using one or more language models to monitor for an occurrence of an invocation phrase for invoking an automated assistant. The operations can further include detecting, based on the processing, an occurrence of the invocation phrase in a portion of the audio data. Based on the processing, or any additional processing using one or more additional language models, a determination can be made as to whether the audio data includes an invocation phrase that corresponds to a stored user profile. When the audio data includes an invocation phrase that corresponds to a stored user profile, a language assigned to the user profile can be identified. Based on the identified language and/or a portion(s) of the audio data, a language model can be selected. Using the selected language model, additional portions of the audio data can be processed and responsive content can be provided back to the user based on the processing of the additional portions of the audio data.

In some implementations, when a user profile is associated with multiple different languages, and each language is associated with a probability the respective language will be employed during an interaction, the probability for each language can be dynamic. For example, a user profile can initially indicate that a first language has a probability of A (e.g., 70%) and a second language has a probability of B (e.g., 30%) before starting a dialogue session between the user and an automated assistant. During the interaction, the automated assistant can detect that a first query is in the second language. In response, the automated assistant can cause one or more probabilities stored in association with the user profile to be modified. For instance, during at least the remainder of the dialog, the user profile can indicate that the probability for the first language is reduced (e.g., 5%) and the probability for the second language can be increased (e.g., 95%).

Multiple user profiles can be managed by an automated assistant that is accessible through a computing device that is interacted with by multiple different users. In this way, a language model selected by the automated assistant can be based on a user profile that is selected according to the user that is interacting with the automated assistant. The automated assistant can identify the user profile and one or more language(s) that are indicated in the user profile as having at least a threshold likelihood of use by the user, at least in the instant context. In some implementations, a user can be associated with multiple user profiles that are associated with different devices, or a single user profile that identifies languages that are preferred for particular devices. For example, a user can prefer to speak a particular language in their vehicle when communicating with an in-vehicle automated assistant, but prefer to speak a different language in their house where other persons who also speak the different language are present. Therefore, the user profile can identify multiple devices and language(s) and corresponding probabilities for each device of the identified multiple devices.

In some implementations, a language selected for a particular user can be based on application data available to the automated assistant. Such application data can correspond to applications that are loaded onto devices through which the user interacts with the automated assistant. For example, a computing device that includes an automated assistant interface can also host an email application that includes emails written in a particular language. The automated assistant can acknowledge the particular language (e.g., French) and confirm that the user would prefer to interact with the automated assistant using that particular language when operating the computing device, the application, and/or any other device or module that can be associated with the automated assistant. For example, the automated assistant can specifically prompt the user with a question such as, "I noticed used you understand French, would you like to interact using French?" Depending on the response, the automated assistant can modify the user profile to indicate the preference of the user to interact using a particular language for a device or application.

In some additional or alternative implementations described herein, a speech recognition model (or other language model) can be preemptively loaded at a client device prior to a user invoking the automated assistant. For example, a language model can be preemptively loaded at a client device based on location data, message data (e.g., an email that includes travel plans), contact data, calendar data, and/or any other data that can be used to infer that the user would prefer a particular language during an upcoming event or context. Furthermore, in some additional or alternative implementations, a language model can be selected based on background noise captured in audio data, which can be used to infer a language with which the user may prefer to speak in a particular context. For instance, the user can explicitly request that the automated assistant translate a particular portion of content (e.g., text that the user will be reading out loud, audio that the user is listening to, etc.). The audio data corresponding to the request can include background noise, therefore the automated assistant can process the audio data to determine that the user is requesting a translation, and also determine the language in which the user would like the final translation to be in.

In some implementations, a number of languages identified by a user profile can change according to an interest of the user in other languages. For instance, a user profile can identify a default language for the user, but as the user further interacts with the automated assistant, the automated assistant can identify additional languages with which to engage with the user. As a result, the automated assistant can push additional language packages to a device of the user, in order that a language model operating on the device can properly convert voice-to-text when the user is communicating with the automated assistant. In some implementations, a language package can be pushed to a device in anticipation of the user interacting with the automated assistant at a particular time in the future. For instance, a user can create a calendar event corresponding to a time in the future, and a title for the calendar event be written in a different language than a default language of the user profile. When the calendar event approaches (e.g., a day before the calendar event), the automated assistant can cause a language package corresponding to the different language to be pushed to the device at which the user created the calendar event. Alternatively, when the calendar event identifies a location, and the automated assistant is aware of a particular computing device that the user typically uses at that location, the automated assistant can cause the language package to be pushed to that particular computing device. In this way, network bandwidth can be optimized by pushing language packages at a time when the user is on a faster or more accessible network, rather than when the user is traveling or otherwise not within a predictably reliable network.

The above description is provided as an overview of some implementations of the present disclosure. Further description of those implementations, and other implementations, are described in more detail below.

In some implementations, a method implemented by one or more processors is set forth as including operations such as processing audio data using one or more acoustic models to monitor for an occurrence of an invocation phrase configured to invoke an automated assistant. The audio data can be based on detection of spoken input of a user at a client device that includes an automated assistant interface for interacting with the automated assistant. The method can further include detecting, based on processing the audio data using the one or more acoustic models, the occurrence of the invocation phrase in a portion of the audio data, and determining, based on processing of the audio data using the one or more acoustic models or other processing of the audio data using one or more other acoustic models, that the portion of the audio data that includes the invocation phrase corresponds to a user profile that is accessible to the automated assistant. The method can further include identifying a language assigned to the user profile, and selecting a speech recognition model for the language. The speech recognition model for the language can be based on determining the portion of the audio data corresponds to the user profile, and is based on identifying the language as assigned to the user profile. The method can also include using the selected speech recognition model to process a subsequent portion of the audio data that follows the portion of the audio data, and causing the automated assistant to provide responsive content that is determined based on the processing of the subsequent portion using the selected speech recognition model.

In some implementations, the method can further include identifying an additional language assigned to the user profile. Furthermore, selecting the speech recognition model can include selecting the speech recognition model in lieu of an additional speech recognition model for the additional language.

In some implementations, selecting the speech recognition model in lieu of the additional speech recognition model for the additional language can include identifying one or more contextual parameters associated with the audio data, and selecting the speech recognition model based on the one or more contextual parameters being more strongly associated, in the user profile, with the language than with the additional language. The one or more contextual parameters can include an identifier of the client device. The one or more contextual parameters can include one or multiple of: a time of day, a day of the week, and a location of the client device.

In some implementations, selecting the speech recognition model for the language can include selecting the speech recognition model based on at least one probability assigned to the language in the user profile, wherein the at least one probability is based on previous interactions, with the automated assistant, that are associated with the user profile.

In some implementations, the at least one probability is associated with one or more contextual parameters, and the method can further include identifying that the one or more contextual parameters are associated with the audio data, and using the at least one probability in the selecting based on the at least one probability being associated with the one or more contextual parameters identified as associated with the audio data.

In some implementations, using the selected speech recognition model to process the subsequent portion of the audio data that follows the portion of audio data can include using the selected speech recognition model in generating text, in the language, that corresponds to the subsequent portion. Furthermore, causing the automated assistant to provide responsive content that is determined based on the processing of the subsequent portion using the selected speech recognition model can include: generating the responsive content based on the text, and causing the automated assistant interface to render output that is based on the responsive content.

In some implementations, the automated assistant can be configured to access multiple different user profiles that are: available at the client device, and associated with multiple different users of the client device. In some implementations, the multiple different user profiles can each identify one or more corresponding languages and a corresponding language probability for each of the corresponding languages. Furthermore, the corresponding language probabilities can each be based on previous interactions between a corresponding one of the multiple different users and the automated assistant.

In some implementations, using the selected speech recognition model to process the subsequent portion of the audio data can include using the selected speech recognition model to generate first text in the language. Furthermore, the method can include identifying an additional language assigned to the user profile, and selecting an additional speech recognition model for the additional language. Selecting the additional speech recognition model for the additional language can be based on determining the portion of the audio data corresponds to the user profile, and can be based on identifying the additional language as assigned to the user profile. Furthermore, the method can include using the selected additional speech recognition model to process the subsequent portion of the audio data that follows the portion of the audio data. Using the selected additional speech recognition model to process the subsequent portion of the audio data can include using the selected speech recognition model to generate second text in the additional language, and selecting the first text in the language, in lieu of the second text in the additional language. Furthermore, causing the automated assistant to provide responsive content that is determined based on the processing of the subsequent portion using the selected speech recognition model can include: causing, based on selecting the first text in the first language, the automated assistant to provide responsive content that is determined based on the first text in the language.

In yet other implementations, a method implemented by one or more processors is set forth as including operations such as processing audio data. The audio data can be based on detection of spoken input of a user at a client device, and the client device can include an automated assistant interface for interacting with the automated assistant. The method can further include determining, based on processing of the audio data, that at least a portion of the audio data matches a user profile accessible to the automated assistant, and identifying at least one probabilistic metric assigned to the user profile and corresponding to a particular speech recognition model, for a particular language. The method can also include, based on the at least one probabilistic metric satisfying a threshold: selecting the particular speech recognition model, for the particular language, for processing the audio data, and processing the audio data, using the particular speech recognition model for to the particular language, to generate text, in the particular language, that corresponds to the spoken input. The method can further include causing the automated assistant to provide responsive content that is determined based on the generated text.

In some implementations, the user profile further includes an additional probabilistic metric corresponding to at least one different speech recognition model, for a different language. Furthermore, the method can include, based on the additional probabilistic metric failing to satisfy the threshold, refraining from processing the audio data using the different speech recognition model.

In some implementations, the method can include identifying current contextual data associated with the audio data. Identifying the at least one probabilistic metric can be based on a correspondence between the current contextual data and the at least one probabilistic metric. In some implementations, the current contextual data can identify a location of the client device or an application that is being accessed via the client device when the spoken input is received. In some implementations, the current contextual data identifies the client device. In some implementations, the probabilistic metric can be based on past interactions between the user and the automated assistant.

In yet other implementations, a method implemented by one or more processors is set forth as including operations that include receiving audio data. The audio data can be based on detection of spoken input of a user at a client device, the client device including an automated assistant interface for interacting with an automated assistant. The method can also determining that the audio data corresponds to a user profile accessible to the automated assistant, and identifying a first language assigned to the user profile, and a first probability metric assigned to the first language in the user profile. The method can further include selecting a first speech recognition model for the first language. Selecting the first speech recognition model for the first language can be based on identifying the first language as assigned to the user profile. The method can also include using the selected first speech recognition model to generate first text in the first language, and a first measure that indicates a likelihood the first text is an appropriate representation of the spoken input. The method can further include identifying a second language assigned to the user profile, and a second probability metric assigned to the second language in the user profile. Additionally, the method can include selecting a second speech recognition model for the second language. Selecting the second speech recognition model for the second language can be based on identifying the second language as assigned to the user profile. The method can also include using the selected second speech recognition model to generate second text in the second language, and a second measure that indicates a likelihood the second text is an appropriate representation of the spoken input. The method can further include selecting the first text in the first language in lieu of the second text in the second language. Selecting the first text in the first language in lieu of the second text in the second language can be based on: the first probability metric, the first measure, the second probability metric, and the second measure. Furthermore, the method can include, in response to selecting the first text, causing the automated assistant to provide responsive content that is determined based on the selected first text.

In some implementations, the method can include identifying a current context associated with the audio data. Identifying the first probability metric can be based on the first probability metric corresponding to the current context. Identifying the second probability metric can be based on the second probability metric corresponding to the current context. In some implementations, determining that the audio data corresponds to the user profile can be based on comparing features of the audio data to features of the user profile.

Aspects of the present disclosure may advantageously reduce incidents during which a spoken language utterance is not interpreted by an appropriate speech recognition model. Consequently, an improved response to user input may be received, reducing occasions on which an automatic assistant is unresponsive or does not operate as intended. As well as improving functionality for a user, this may reduce load on computer and/or network resources used to implement such an assistant by reducing repeat commands in order to reach a desired result.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3 illustrates a method for processing audio data according to a speech recognition model that is selected based on contents of a user profile.

DETAILED DESCRIPTION

Figure 1:
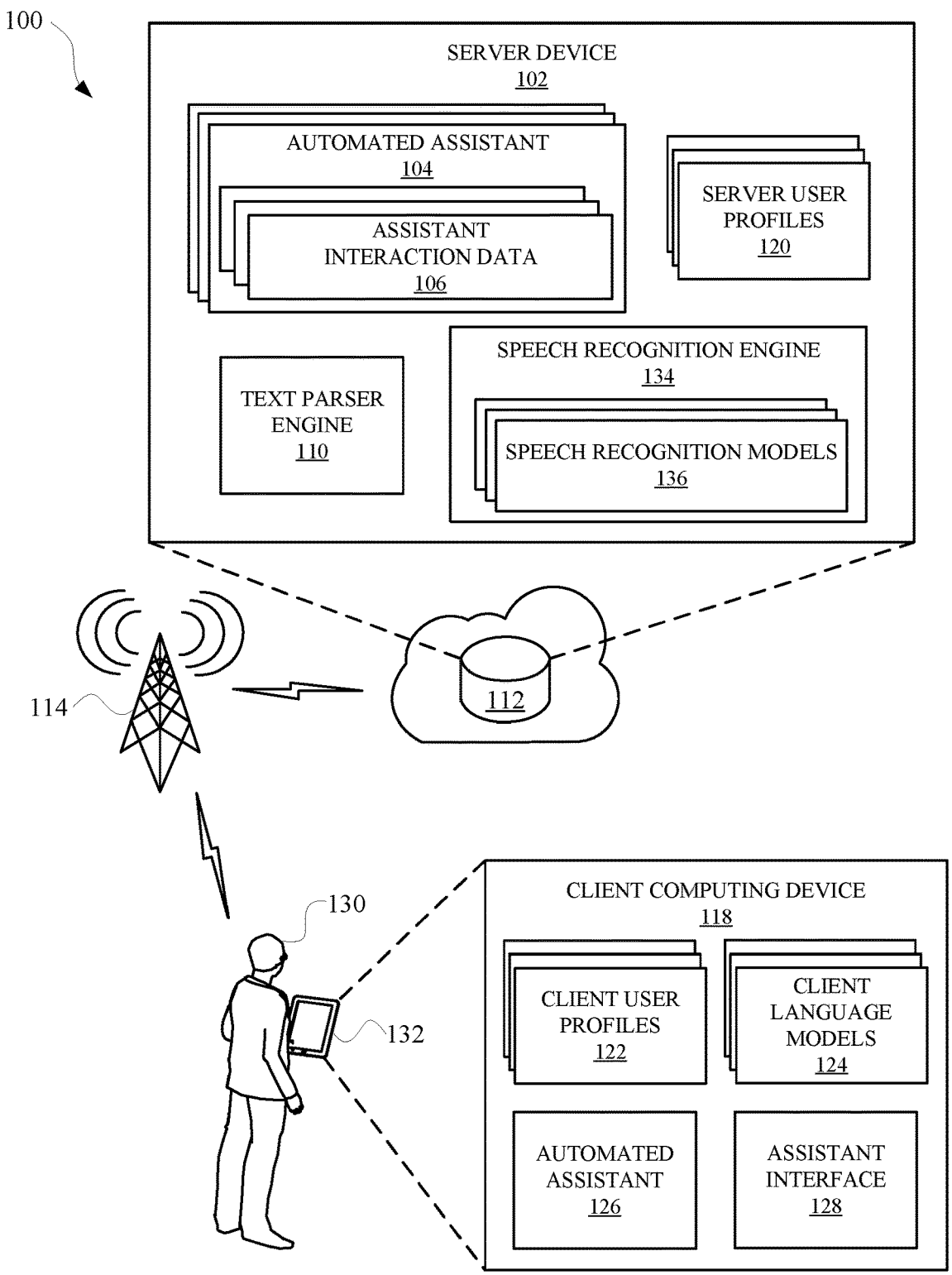
FIG. 1 illustrates a system for selecting a language for an automated assistant to interact with a user.

FIG. 1 illustrates a system 100 for selecting a language for an automated assistant 104 to interact with a user 130. The automated assistant 104 can operate, in part via an automated assistant 126 that is provided at one or more client devices, such as client computing device 118 (e.g., a portable computing device 132), and in part via one or more remote computing device(s) 112, such as a server device 102. The user 130 can interact with the automated assistant 104 via an assistant interface 128 of the client computing device 118. The assistant interface 128 includes user interface input device(s) and user interface output device(s) for use by the automated assistant 126 in interfacing with a user. The assistant interface 128 accepts user interface inputs of the user 130 that are directed to the automated assistant 104, and renders content from the automated assistant 104 for presentation to the user 130. The assistant interface 128 can include, a microphone, a camera, a touch screen display, and/or any other user interface input device(s) of the client computing device 118. The assistant interface 128 can also include a display, projector, a speaker, and/or any other user interface output device(s) of the client computing device 118 that can be used to render content from the automated assistant 104. A user can initialize the automated assistant 104 by providing a verbal, textual, or a graphical input to the assistant interface 128 to cause the automated assistant 104 to perform a function (e.g., provide data, control a peripheral device, access an agent, etc.). The client computing device 118 can include a display device, which can be a display panel that includes a touch interface for receiving touch inputs and/or gestures for allowing a user to control applications of the client computing device 118 via the touch interface. In some implementations, client computing device 118 can lack a display device, thereby providing an audible user interface output, without providing a graphical user interface output. Furthermore, the client computing device 118 can provide a user interface input device, such as a microphone, for receiving spoken natural language inputs from the user 130 (and from additional unillustrated users).

The client computing device 118 can be in communication with the remote computing device 112 over a network 114, such as the internet. The client computing device 118 can offload computational tasks to the remote computing device 112 in order to, for example, conserve computational resources at the client device 118 and/or leverage more robust resources available at the remote computing device 112. For instance, the remote computing device 112 can host the automated assistant 104, and the client computing device 118 can transmit inputs received at one or more assistant interfaces to the remote computing device 112. However, in some implementations, the automated assistant 104 can be hosted by the automated assistant 126 at the client computing device 118. In various implementations, all or less than all aspects of the automated assistant 104 can be implemented by the automated assistant 126 at the client computing device 118. In some of those implementations, aspects of the automated assistant 104 are implemented via the local automated assistant 126 of the client computing device 118 and interface with the remote computing device 112 that implements other aspects of the automated assistant 104. The remote computing device 112 can optionally serve a plurality of users and their associated assistant applications via multiple threads. In implementations where all or less than all aspects of the automated assistant 104 are implemented via the local automated assistant 126 of the client computing device 118, the local automated assistant 126 can be an application that is separate from an operating system of the client device 118 (e.g., installed "on top" of the operating system)—or can alternatively be implemented directly by the operating system of the client device 118 (e.g., considered an application of, but integral with, the operating system).

In some implementations, the remote computing device 112 can include a speech recognition engine 134 that can process audio data received at an assistant interface to determine text and/or other semantic representation(s) of a spoken utterance embodied in the audio data. The speech recognition engine 134 can utilize one or more speech recognition models 136 in determining text and/or other semantic representations of a spoken utterance embodied in audio data. As described herein, multiple speech recognition models 136 can be provided, and each can be for a corresponding language. For example, a first speech recognition model can be for English, a second speech recognition model can be for French, etc. Further, as described herein, which of multiple speech recognition models 136 is utilized in processing of audio data can be based on, for example, information contained in a user profile determined to correspond to the audio data being processed. For example, in some implementations a given user profile can be determined to correspond to audio data being processed based on matching voice features of the audio data to voice features associated with the user profile. Also, for example, in some implementations a given user profile can additionally or alternatively be determined to correspond to audio data being processed based on matching other sensor data (e.g., data from a camera and/or data from a fingerprint sensor), from sensor(s) of the client computing device 118, to corresponding data of the user profile. Continuing with the examples, if the user profile indicates that an English speech recognition model is significantly more likely to be utilized for the user than a French speech recognition model, the English speech recognition model can be utilized to process the audio data. The English speech recognition model can optionally be utilized in lieu of utilizing the French speech recognition model (or any other speech recognition model for a non-English language).

Additionally or alternatively, multiple speech recognition models 136 for multiple different languages can be utilized in processing of audio data to generate multiple candidate semantic representations (e.g., each corresponding to a different language). In some of those implementations, probability metrics (optionally dependent on current contextual parameter(s)) for the multiple different languages and/or measures for each of the multiple candidate semantic representations can be utilized to select only one of the candidate semantic representations as appropriate for generating and providing content that is responsive to the given spoken utterance.

In some implementations, the speech recognition models 136 each include one or machine learning models (e.g., neural network models) and/or statistical models for determining text (or other semantic representation) that corresponds to a spoken utterance embodied in audio data. In some implementations, the speech recognition engine 134 can utilize one of the speech recognition models 136 to determine phonemes, for a corresponding language, that are included in the audio data, and then generate text, for the corresponding language, based on the determined phonemes. In some implementations, speech recognition engine 134 receives an audio recording of voice input, e.g., in the form of digital audio data, and uses one or more models to convert the digital audio data into one or more text tokens. The model or models used by such functionality, which can collectively be considered a speech recognition model, generally model the relationship between an audio signal and phonetic units in a language, along with word sequences in the language. In some implementations, speech recognition models may include one or more of acoustic models, language models, pronunciation models, etc., as well as models combining functionality of one or more of such models. In some implementations, for example, speech recognition models may be implemented as finite state decoding graphs including a plurality of paths or pathways.

The automated assistant 104 can operate according to one or more language models simultaneously in order to be responsive to natural language inputs from the user 130 and/or provide responsive content to the user 130. For example, in some implementations, the automated assistant 104 can operate using an invocation phrase model simultaneously with using a speech recognition model that is associated with a particular language. In this way, the automated assistant can process audio data that embodies an invocation phrase and one or more commands provided in the particular language, and be responsive to both the invocation phrase and the one or more commands. The text, and/or semantic representations of text, converted from the audio data can be parsed by a text parser engine 110 and made available to the automated assistant 104 as textual data or semantic data that can be used to generate and/or identify command phrases from the user 130 and/or a third party application.

In some implementations, a language model can include or refer to an acoustic model, a speech recognition model, an invocation phrase model, a voice-to-text model, a voice-to-semantic representation model, a text-to-semantic representation model, and/or any other model that can be used to translate a natural language input into data that can be processed by an application or a device. In some implementations, a language that the automated assistant 104 uses to communicate with the user 130 can be selected from one or more languages identified in a user profile. The automated assistant can access a user profile from one or more server user profiles 120 and/or one or more client user profiles 122. For example, when the user 130 is communicating with an automated assistant 126 at the client computing device 118, the user 130 can provide a spoken natural language input to an assistant interface 128 of the client computing device 118. The spoken natural language input can be converted into audio data, which can be processed by a client language model 124, such as an invocation phrase model for identifying whether the audio data embodies an invocation phrase for invoking the automated assistant 126. The client language model 124 can also provide a voice signature of the user 130. Based on the voice signature of the user 130, the automated assistant 126 can select a client user profile 122 that corresponds to the user 130. The client user profile 122 can identify one or more languages that the identified user 130 prefers to communicate in, depending on a context of an interaction, or characteristics of the interaction between the user 130 and the automated assistant 126.

In some implementations, the invocation phrase model can be employed at the client computing device 118 to determine whether the user 130 is intending to invoke the automated assistant 104. When the user provides a natural language input to the assistant interface 128, and the natural language input includes an invocation phrase for invoking the automated assistant 104, the client computing device 118 can cause the automated assistant 104 at the server device 102 to receive the natural language input and/or subsequent natural language inputs from the user 130. For instance, in response to determining that the user 130 is intending to invoke the automated assistant 104 at the client computing device 118, one or more communication channels can be established between the client computing device 118 and the server device 102. Thereafter, as the user continues to provide natural language inputs to the assistant interface 128, the natural language inputs will be converted into data that is then transmitted over the network 114 and processed by the server device 102. Thereafter, the automated assistant 104 can analyze the data to determine a user profile, that corresponds to the user, from one or more server user profiles 120 available at the server device 102. A speech recognition model 136 from the selected server user profile can be selected for communicating with the user 130. The selection of the speech recognition model 136 from the user profile can be based on a context of the user 130, one or more confidence scores or probabilities associated with one or more speech recognition model 136 identified by the user profile, and/or any other information that can be used to select a language.

In some implementations, each language identified by a user profile of the server user profiles 120 and/or the client user profiles 122 can be associated with a probability or a confidence score that can be static or dynamic. For example, a default language for a particular user can be identified by a user profile and include a correspondence to a confidence score that is higher than other confidence scores associated with other languages identified by the user profile. In some implementations, a language identified by a user profile can be associated with multiple confidence scores, and each confidence score of the multiple conference scores can be associated with a context. For example, the user profile can identify "home" as a location context for a particular language and a confidence score for the location context for the particular language. Because the user may prefer to communicate using the particular language at home over other languages, the user profile can identify a separate language and a separate confidence score associated with the separate language that is lower than the confidence score corresponding to the "home" location context. In other words, the user profile can indicate, using confidence scores and contextual data, that the user prefers to speak a particular language at home over other languages that are identified by the user profile.

In some implementations, a confidence score for a particular language and for a particular context can be based on assistant interaction data 106, which can be accessible to an automated assistant at the server device 102 or the client computing device 118. The assistant interaction data 106 can be generated based on historical interactions between one or more users and the automated assistant. Therefore, as the user interacts with the automated assistant using one or more different languages, the assistant interaction data 106 can reflect the one or more different languages that the user has communicated with. The confidence scores associated with the different languages, as identified by a user profile, can be dynamically updated based on how the assistant interaction data 106 changes over time. For example, contextual data identified by a user profile can identify a contact with which the user communicates with through the automated assistant by employing the automated assistant to compose messages to be sent to the contact. Initially, a user profile can identify a particular language that has a first confidence score when composing messages. However, if the user subsequently directs the automated assistant to compose a message for the contact in another language, a second confidence score, that is associated with the other language and a context of sending a message to the contact, can be increased above the first confidence score. In this way, the other language will become the default language according to the user profile, at least when the user is directing the automated assistant to compose a message for the contact. As a result, the user does not have to explicitly specify the other language when composing a message to the contact, thereby conserving computational resources that would otherwise be wasted on processing audio in a variety of different languages.

Figure 2:
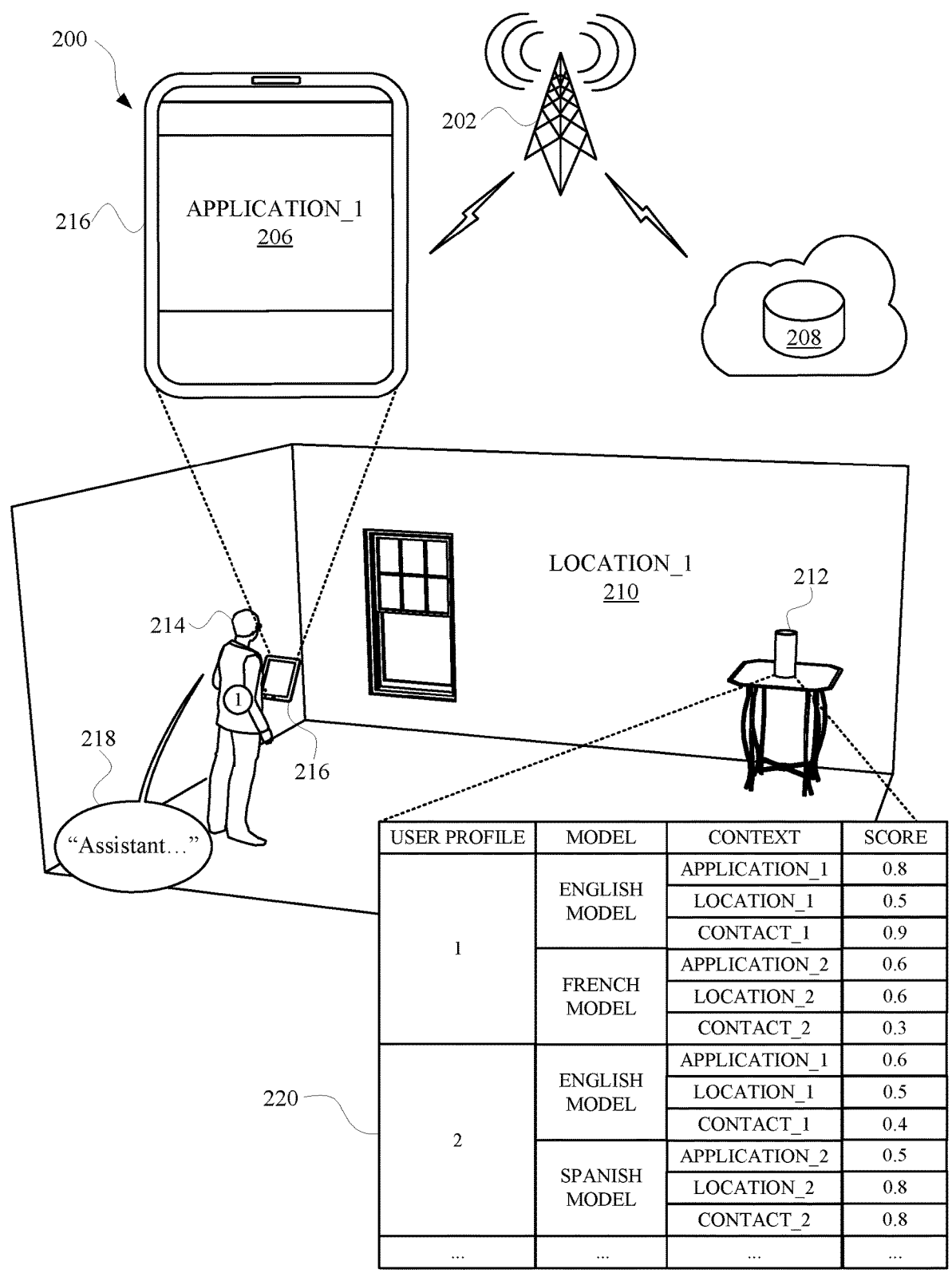
FIG. 2 illustrates a diagram of an example of a speech recognition model being selected based on a context in which a user is interacting with, or invoking, an automated assistant.

FIG. 2 illustrates a diagram 200 of an example of a language model being selected based on a context in which a user 214 is interacting with, or invoking, an automated assistant. Specifically, a user 214 can interact with an automated assistant through an assistant device 212. The assistant device 212 can store or access a table 220 that identifies one or more user profiles corresponding to different users that have or can interact with the automated assistant. For example, the table 220 can identify the user 214 (i.e., "1") and a separate user (i.e., "2"), each of which can be associated with different user profiles. A user profile can identify language preferences of a user, and the language preferences can be based on a context in which the user is interacting with the automated assistant. In some implementations, the language preferences can be adapted by the automated assistant overtime as the user interacts with the automated assistant (and/or other platforms) using different languages.

For example, the assistant device 212 can be located within a home of the user 214, which can be a residence of a separate user that also interacts with the automated assistant through the assistant device 212. The assistant device 212 can switch between user profiles according to the user that is employing the assistant device 212 to interact with the automated assistant. For instance, the user 214 can interact with the automated assistant through the assistant device 212 using English or French, while a separate user can interact with the automated assistant through the assistant device 212 using English or Spanish. In order for the assistant device 212 to understand a respective user and communicate with the respective user, the assistant device 212 can select a language model (e.g., a speech recognition model) for interpreting inputs from the user. The language model can be selected based on contents of the table 220 and/or a user profile associated with the respective user. Each language model can be associated with a score or probability, which quantifies a likelihood that the user is or will be communicating with the automated assistant according to a particular language.

In some implementations, the score or probability can be based on a context in which the user is interacting with the automated assistant or the assistant device 212. For example, the user 214 can provide a spoken natural language input 218, such as "Assistant," in order to invoke the automated assistant. The assistant device 212 can include an automated assistant interface that receives the spoken natural language input 218 for further processing at the assistant device 212. The assistant device 212 can employ a language model (e.g., an invocation phrase model) for determining a voice signature based on characteristics of the voice of the user 214. When the assistant device 212 has identified the voice signature of the user 214, the assistant device 212 can access a table 220 that identifies multiple different user profiles, corresponding to multiple different voice signatures, respectively, and a correspondence between the user profiles and different language models. The table 220 can also provide a correspondence between the language models and scores or probabilities, which can be used to determine whether to employ a particular language model. The scores can be based on a context in which the user 214 is invoking an automated assistant that is accessible through the assistant device 212.

As provided in FIG. 2, the user 214 can be operating an application 206 (i.e., APPLICATION_1) through a portable computing device 216, which provides basis for the assistant device 212 to select a particular language model. Alternatively, or additionally, the assistant device 212 can select a language model based on the user 214 being at a location 210. The table 220, or the user profile corresponding to the user 214, can provide a correspondence between a score for a language model and a context of the application and or the location. By identifying the context in which the user 214 is invoking the automated assistant, and comparing the contacts to the table 220, the assistant device 212 can determine the language model that has the highest score for the user 214. For instance, the automated assistant or the assistant device 212 can select the English model based on the user accessing the application 206 and being located at the location 210. Alternatively, if the user was located at LOCATION_2, identified by the table 220, but accessing APPLICATION_1, the automated assistant can select the English model because the score for APPLICATION_1 is greater than the score for LOCATION_2. However, if the user was located at LOCATION_1, but using APPLICATION_2 to communicate with CONTACT_2, the automated assistant can select the French model because the score for LOCATION_1 is less than the sum of the scores for APPLICATION_2 and CONTACT_2 (in other words: 0.5<(0.6+0.3)).

In some implementations, if the automated assistant selects a language model that was not intended by the user 214, and the user corrects the automated assistant by requesting a different language model be employed, the scores for each of the respective language models can be updated. For example, the language model that was initially selected can have its score decreased while the requested language model can have its score increased. If the requested language model (e.g., Swahili) is not identified by a user profile (e.g., the user profile "1" does not identify Swahili), the automated assistant can cause a request to be generated and transmitted over a network 202. The request can be received by a remote device 208, which can store multiple different language models that can be pushed to various devices upon request. For example, if the user 214 requests that a Swahili language model be employed, the automated assistant can request the Swahili language model from the remote device 208 and modify the user profile to identify the Swahili language model. Furthermore, the automated assistant can modify the user profile to identify a context in which the user requested the Swahili language model, and provide a score for the Swahili language model in the identified context (e.g., the user 214 being located at LOCATION_1).

In some implementations, the entries in the table 220 can correspond to same contexts but different scores for each model. For instance, APPLICATION_1 and APPLICATION_2 can be the same applications, LOCATION_1 and LOCATION_2 can be the same locations, and CONTACT_1 and CONTACT_2 can be the same contacts. Furthermore, each application, location, and/or contact can correspond to different scores, depending on the model being referenced. For example, if the user 213 is using the application at the location, the English model can be selected over the French model, since the total score for the English model would be 0.13 and the score for the French model would be 0.12. As another example, if the user 213 is at the location and communicating with the contacts, the English model would be selected over the French model, since the total score for the English model would be 0.14 and the score for the French model would be 0.9.

FIG. 3 illustrates a method 300 for processing audio data according to a speech recognition model that is selected based on contents of a user profile. The method 300 can be performed by one or more computing devices or applications, and/or any other apparatus or module capable of processing a user input. The method 300 can include an operation 302 of processing audio data using one or more acoustic models to monitor for an occurrence of an invocation phrase configured to invoke an automated assistant. The audio data can be generated based on an audible input that is received at a client device that includes an automated assistant interface for interacting with the automated assistant. The automated assistant interface can be, for example, an audio subsystem of the client device and can therefore include one or more of a microphone, a speaker, and/or any other apparatus for transmitting audio related data.

In some implementations, the client device can store one or more acoustic models, and/or access one or more acoustic models over a network, such as the internet. The one or more acoustic models can include a first acoustic model, such as an invocation phrase acoustic model, for identifying the invocation phrase embodied in the audio data. The invocation phrase can identify the device, the automated assistant, and/or any other feature that can be associated with the automated assistant (e.g., "Assistant"). In some implementations, the first acoustic model can be agnostic to the language in which the invocation phrase is provided, but, rather the first acoustic model can process the audio data to identify pitch, tone, accents, intonation, and/or any other feature of speech that can be used to identify a phrase and/or a user. The first acoustic model can be arranged as an always active acoustic model in order that the automated assistant can be triggered at any time when the invocation phrase is received at the automated assistant interface. Simultaneously, in some implementations, one or more other acoustic models can be active, at least according to a user profile that is stored at the client device or otherwise accessible to the automated assisting.

The method 300 can further include an operation 304 of detecting, based on the processing of the audio data, the occurrence of the invocation phrase in a portion of the audio data. For example, when the invocation phrase is, "Assistant," the first acoustic model can receive the portion of audio data and output either a semantic representation of the word "assistant," or text corresponding to the word "assistant." The automated assistant can then compare the semantic representation, or the text, to one or more stored representations of the invocation phrase in order to determine whether the user is intending to invoke the automated assistant.

The method 300 can also include an operation 306 of determining that the portion of the audio data that includes the invocation phrase corresponds to a user profile accessible to the automated assistant. This determination can be performed based on the processing of the audio data using the one or more acoustic models, or other processing using one or more other acoustic models. For example, in some implementations, the first acoustic model can receive the portion of audio data as the input and provide an output that indicates that the user is intending to invoke the automated assistant. The first acoustic model can also provide an output that identifies the user that provided the audio input corresponding to the audio data. Specifically, the first acoustic model can operate to distinguish how different users say a particular invocation phrase. As an example, a first user may provide an invocation phrase at a pitch that is higher than a second user provides the same invocation phrase, therefore the first acoustic model can distinguish the first user from the second user by analyzing a level of pitch exhibited by the audio data. In some implementations, the automated assistant can access a table of voice signatures that identifies voice characteristics for each user that accesses the automated assistant. In this way, the automated assistant can use one or more acoustic models to characterize voice characteristics and identify a user profile of a user based on a degree of correspondence between an input from the user and the voice characteristics stored in association with the user profile in the table of voice signatures.

The user profile can identify one or more languages corresponding to one or more speech recognition models for processing natural language inputs from the user whose language preferences are identified by the user profile. The user profile can identify contexts in which the user prefers particular languages, probabilities or confidence scores associated with the particular languages, availability of speech recognition models corresponding to the languages, and/or any other data that can be used to identify language preferences of the user. The contexts identified by the user profile can include applications, locations, devices, contacts, times, and/or any other data that can characterize a context in which a user communicates using a particular language. In this way, a current context of the user that provided the audio input corresponding to the audio data can be compared to contextual data identified in the user profile of the user in order to identify a language that the user prefers to communicate given the current context. For example, if the user is at home and the user profile indicates that the user prefers to use Spanish when at home, the automated assistant can select Spanish as a preferred of language when the user invokes the automated assistant at home.

The method 300 can also include an operation 308 of identifying a language assigned to the user profile. The user profile can include multiple different languages that are assigned to the user profile, and the language identified at operation 308 can depend on a confidence score associated with the language in the user profile, contextual data corresponding to the language in the user profile, and/or any other data identified in the user profile suitable for processing when identifying the language. In some implementations, identifying the language assigned to the user profile can include flagging the language as the active language for the automated assistant at the time the user provides the invocation phrase or subsequently thereafter.

The method 300 can further include an operation 310 of selecting a speech recognition model for the language based on identifying the language as assigned to the user profile. The speech recognition model can be selected from one or more candidate speech recognition models. In this way, the automated assistant can switch between speech recognition models in order to ensure that the automated assistant can interact with the user despite the user communicating in multiple different languages. In some implementations, the user profile can provide a correspondence between a language identified in the user profile and a speech recognition model. In this way, when the automated assistant identifies the language preferred by the user, the automated assistant will be able to also identify the speech recognition model corresponding to the preferred language.

The method 300 can also include an operation 312 of using the selected speech recognition model to process a subsequent portion of the audio data that follows the portion of audio data. In other words, a client device that includes the automated assistant at which the audio input is received, can store a snippet of audio data that embodies the invocation phrase as well as one or more other commands provided by the user. The automated assistant can cause a portion of the audio data to be processed by the first acoustic model to determine whether the user provided the invocation phrase. Any portion of the audio data that does not embody the invocation phrase can be processed by the speech recognition model. In this way, the user does not need to repeat any commands after this speech recognition model has been selected, but rather can rely on the automated assistant to adapt to variations in language that can occur as the user is interacting with the automated assistant.

The method 300 can optionally include an operation 314 of causing the automated assistant to provide responsive content that is determined or generated based on the processing of the subsequent portion of the audio data using the selected speech recognition model. The responsive content can be any output capable of being provided by a computing device. For example, the responsive content can be a natural language output generated by a speech generation model corresponding to the language identified at operation 308. Therefore, the natural language output can be an audio output, a video output, and/or any other output that can be characterized as a natural language output. When the subsequent portion of audio data includes a query from the user, the responsive content can be an answer to the query that is provided in the language identified at operation 308.

Figure 4:
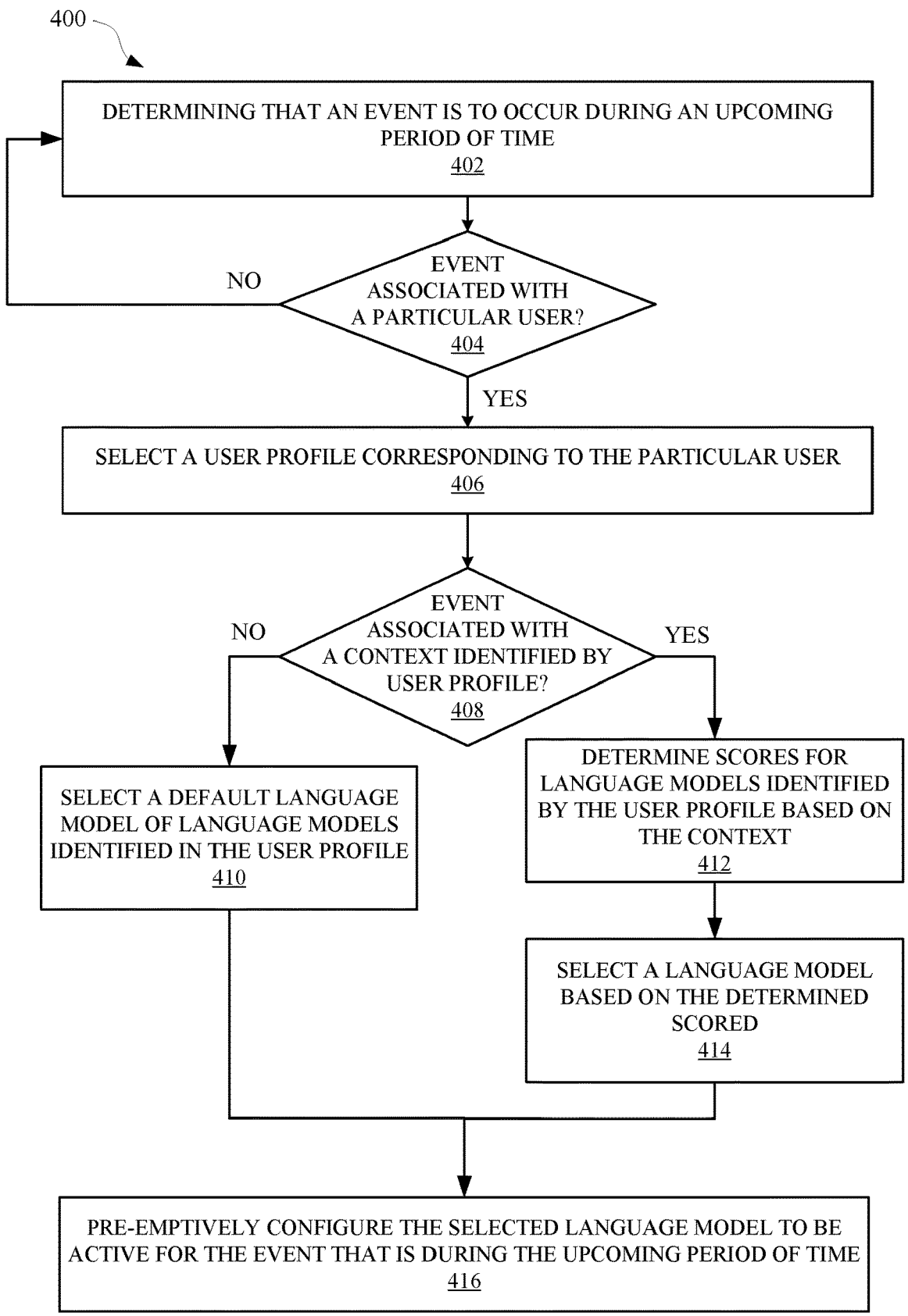
FIG. 4 illustrates a method for scheduling a language model to be pre-emptively activated according to contextual data accessible to an automated assistant.

FIG. 4 illustrates a method 400 for scheduling a language model to be pre-emptively activated according to contextual data accessible to an automated assistant. The method can be performed by one or more computing devices, applications, and/or any other apparatus or module capable of interacting with an automated assistant. The method 400 can include an operation 402 of determining that an event is to occur during an upcoming period of time. The event can be described by a stored calendar event or other data that characterizes the event and sets forth the period of time at which the event will occur. An automated assistant can determine that the event is going to occur at the upcoming period of time by accessing account data associated with a particular user or group of users. Alternatively, the automated assistant can be at least partially hosted at a device that includes a memory that stores data corresponding to multiple different events that are associated with multiple different users. In some implementations, the event can be identified over a network, such as the internet, and can be associated with publicly available data that is associated with one or more different users. For example, the event can be associated with an upcoming public festival or public holiday that can be associated with a particular language.

The method 400 can further include an operation 404 of determining whether the event is associated with a particular user. The determination can be based on a comparison between event-related data and user-related data that are accessible to the automated assistant. For example, an event can be associated with the user when the event is described by a calendar entry and includes the user as an attendee. Furthermore, an event can be associated with a particular user when an account associated with the user includes information that is associated with the event. Moreover, the event can be associated with a particular user when historical interaction data between the user and an automated assistant identifies the event, or otherwise describes information associated with the event. For example, if a particular user has requested that the automated assistant order tickets to a particular destination that is also the location of the event, the event can be associated with the particular user.

When the event is not associated with a particular user, the method 400 can refer back to operation 402 of monitoring whether an upcoming event is to occur. Otherwise, when the event is associated with the particular user, the method 400 can proceed to operation 406 of selecting a user profile corresponding to the particular user. The user profile can be identified in an index or table that lists one or more user profiles and provides a correspondence between the user profiles and one or more different users. For example, a computing device that at least partially hosts an automated assistant can store one or more user profiles, which can designate particular language models to use for communicating with or interpreting inputs from a particular user. Therefore, because the event is associated with a particular user, a user profile can be selected in order to identify a suitable language model to activate pre-emptively for the upcoming event.

The method 400 can also include an operation 408 of determining whether the event is associated with a context identified by the selected user profile. If the event is not associated with a context identified by the user profile, the method 400 can proceed to an operation 410 of selecting a default language model of language models identified in the user profile. For example, the selected user profile can identify contexts such as a location, a contact or person associated with the event, an application or a device associated with the event, a time for the event, and/or any other information that can identify a context in which an event can occur.

When the event is associated with a context identified by the user profile, the method 400 can proceed to an operation 412 of determining one or more scores for one or more language models identified by the user profile based on the context. For example, the event can be associated with a location, and the user profile can identify: a first score for a first language model and the location, and a second score for a second language model and the location. If the first score is greater than the second score, the first language model can be selected for pre-emptively activating for the upcoming event.

When the scores are determined for the language models identified by the user profile, then the method 400 can proceed to an operation 404 of selecting a language model based on the determined score. In some implementations, when two or more scores are the same or substantially similar, additional context can be considered in order to further distinguish the scores and select a suitable language model. For example, if the event is associated with contacts that the user has previously communicated with using a particular language, the user profile can identify one or more of the contacts in order to determine additional scores to consider. The additional scores can be combined with the previously considered scores, and a language model associated with the highest score can be selected for pre-emptively activating.

When a particular language model has been selected user profile, the method 400 can proceed to an operation 416 of preemptively configuring the selected language model to be active for the event that is during the upcoming period of time. In this way, when the event begins, or the period of time is the present time, the selected language model will be active. This can be useful when the event is located in area with limited network connectivity, as the language model would have already been downloaded to the device of the user before the event.

Figure 5:
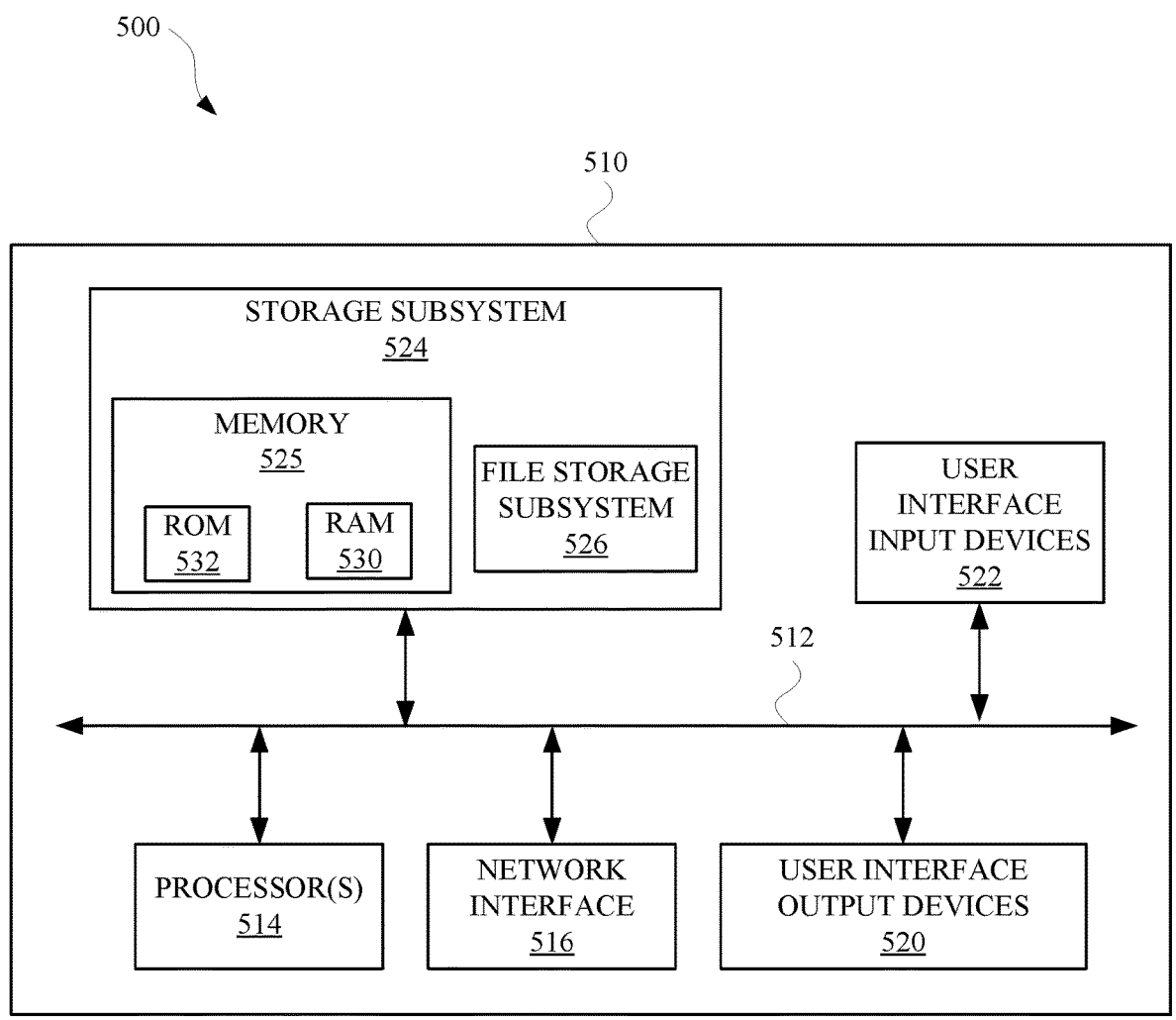
FIG. 5 is a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 300, 400, and/or to implement one or more of server device 102, client computing device 118, portable computing device 132, assistant device 212, and/or any other device or operation discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:

processing audio data using one or more acoustic models to monitor for an occurrence of an invocation phrase configured to invoke an automated assistant, wherein the audio data is based on detection of spoken input of a user at a client device that includes an automated assistant interface for interacting with the automated assistant;

detecting, based on processing the audio data using the one or more acoustic models, the occurrence of the invocation phrase in a portion of the audio data;

determining, based on processing of the audio data using the one or more acoustic models or other processing of the audio data using one or more other acoustic models, that the portion of the audio data that includes the invocation phrase corresponds to a user profile that is accessible to the automated assistant;

identifying a language assigned to the user profile;

selecting a speech recognition model for the language, wherein selecting the speech recognition model for the language is based on determining the portion of the audio data corresponds to the user profile, and is based on identifying the language as assigned to the user profile;

using the selected speech recognition model to process a subsequent portion of the audio data that follows the portion of the audio data; and causing the automated assistant to provide responsive content that is determined based on the processing of the subsequent portion using the selected speech recognition model.

2. The method of claim 1, further comprising:

identifying an additional language assigned to the user profile;

wherein selecting the speech recognition model comprises selecting the speech recognition model in lieu of an additional speech recognition model for the additional language.

3. The method of claim 2, where selecting the speech recognition model in lieu of the additional speech recognition model for the additional language comprises:

identifying one or more contextual parameters associated with the audio data; and selecting the speech recognition model based on the one or more contextual parameters being more strongly associated, in the user profile, with the language than with the additional language.

4. The method of claim 3, wherein the one or more contextual parameters comprise an identifier of the client device.

5. The method of claim 3, wherein the one or more contextual parameters comprise one or multiple of: a time of day, a day of the week, and a location of the client device.

6. The method of claim 1, wherein selecting the speech recognition model for the language comprises selecting the speech recognition model based on at least one probability assigned to the language in the user profile, wherein the at least one probability is based on previous interactions, with the automated assistant, that are associated with the user profile.

7. The method of claim 6, wherein the at least one probability is associated with one or more contextual parameters, and further comprising:
identifying that the one or more contextual parameters are associated with the audio data; and
using the at least one probability in the selecting based on the at least one probability being associated with the one or more contextual parameters identified as associated with the audio data.

8. The method of claim 1, wherein using the selected speech recognition model to process the subsequent portion of the audio data that follows the portion of audio data comprises using the selected speech recognition model in generating text, in the language, that corresponds to the subsequent portion; and
wherein causing the automated assistant to provide responsive content that is determined based on the processing of the subsequent portion using the selected speech recognition model comprises:
generating the responsive content based on the text, and causing the automated assistant interface to render output that is based on the responsive content.

9. The method of claim 1, wherein the automated assistant is configured to access multiple different user profiles that are: available at the client device, and associated with multiple different users of the client device.

10. The method of claim 9, wherein the multiple different user profiles each identify one or more corresponding languages and a corresponding language probability for each of the corresponding languages, the corresponding language probabilities each based on previous interactions between a corresponding one of the multiple different users and the automated assistant.

11. The method of claim 1, wherein using the selected speech recognition model to process the subsequent portion of the audio data comprises using the selected speech recognition model to generate first text in the language, and further comprising:
identifying an additional language assigned to the user profile;
selecting an additional speech recognition model for the additional language, wherein selecting the additional speech recognition model for the additional language is based on determining the portion of the audio data corresponds to the user profile, and is based on identifying the additional language as assigned to the user profile;
using the selected additional speech recognition model to process the subsequent portion of the audio data that follows the portion of the audio data, wherein using the selected additional speech recognition model to process the subsequent portion of the audio data comprises using the selected speech recognition model to generate second text in the additional language;
selecting the first text in the language, in lieu of the second text in the additional language;
wherein causing the automated assistant to provide responsive content that is determined based on the processing of the subsequent portion using the selected speech recognition model comprises:
causing, based on selecting the first text in the language, the automated assistant to provide responsive content that is determined based on the first text in the language.

12. A non-transitory computer readable storage medium configured to store instructions that, when executed by one or more processors, cause the one or more processors to perform operations that include:
processing audio data using one or more acoustic models to monitor for an occurrence of an invocation phrase configured to invoke an automated assistant, wherein the audio data is based on detection of spoken input of a user at a client device that includes an automated assistant interface for interacting with the automated assistant;
detecting, based on processing the audio data using the one or more acoustic models, the occurrence of the invocation phrase in a portion of the audio data;
determining, based on processing of the audio data using the one or more acoustic models or other processing of the audio data using one or more other acoustic models, that the portion of the audio data that includes the invocation phrase corresponds to a user profile that is accessible to the automated assistant;
identifying a language assigned to the user profile;
selecting a speech recognition model for the language, wherein selecting the speech recognition model for the language is based on determining the portion of the audio data corresponds to the user profile, and is based on identifying the language as assigned to the user profile;
using the selected speech recognition model to process a subsequent portion of the audio data that follows the portion of the audio data; and
causing the automated assistant to provide responsive content that is determined based on the processing of the subsequent portion using the selected speech recognition model.

13. The non-transitory computer readable storage medium of claim 12, wherein the operations further include:
identifying an additional language assigned to the user profile;
wherein selecting the speech recognition model comprises selecting the speech recognition model in lieu of an additional speech recognition model for the additional language.

14. The non-transitory computer readable storage medium of claim 13, where selecting the speech recognition model in lieu of the additional speech recognition model for the additional language comprises:
identifying one or more contextual parameters associated with the audio data; and
selecting the speech recognition model based on the one or more contextual parameters being more strongly associated, in the user profile, with the language than with the additional language.

15. The non-transitory computer readable storage medium of claim 12, wherein using the selected speech recognition model to process the subsequent portion of the audio data that follows the portion of audio data comprises using the selected speech recognition model in generating text, in the language, that corresponds to the subsequent portion; and
wherein causing the automated assistant to provide responsive content that is determined based on the processing of the subsequent portion using the selected speech recognition model comprises:
generating the responsive content based on the text, and causing the automated assistant interface to render output that is based on the responsive content.

16. The non-transitory computer readable storage medium of claim 12, wherein the automated assistant is configured to access multiple different user profiles that are: available at the client device, and associated with multiple different users of the client device.

17. A system, comprising:
one or more processors; and
memory storing instructions that, when executed by the one or more processors, cause the one or more processors to perform operations that include:
processing audio data using one or more acoustic models to monitor for an occurrence of an invocation phrase configured to invoke an automated assistant, wherein the audio data is based on detection of spoken input of a user at a client device that includes an automated assistant interface for interacting with the automated assistant;
detecting, based on processing the audio data using the one or more acoustic models, the occurrence of the invocation phrase in a portion of the audio data;
determining, based on processing of the audio data using the one or more acoustic models or other processing of the audio data using one or more other acoustic models, that the portion of the audio data that includes the invocation phrase corresponds to a user profile that is accessible to the automated assistant;
identifying a language assigned to the user profile;
selecting a speech recognition model for the language, wherein selecting the speech recognition model for the language is based on determining the portion of the audio data corresponds to the user profile, and is based on identifying the language as assigned to the user profile;
using the selected speech recognition model to process a subsequent portion of the audio data that follows the portion of the audio data; and
causing the automated assistant to provide responsive content that is determined based on the processing of the subsequent portion using the selected speech recognition model.

18. The system of claim 17, wherein the operations further include:
identifying an additional language assigned to the user profile;
wherein selecting the speech recognition model comprises selecting the speech recognition model in lieu of an additional speech recognition model for the additional language.

19. The system of claim 18, where selecting the speech recognition model in lieu of the additional speech recognition model for the additional language comprises:
identifying one or more contextual parameters associated with the audio data; and
selecting the speech recognition model based on the one or more contextual parameters being more strongly associated, in the user profile, with the language than with the additional language.

20. The system of claim 17, wherein selecting the speech recognition model for the language comprises selecting the speech recognition model based on at least one probability assigned to the language in the user profile, wherein the at least one probability is based on previous interactions, with the automated assistant, that are associated with the user profile.

* * * * *